Dec. 10, 1957   J. D. LANGDON   2,815,678
PLUNGER ACTUATOR-PACKER
Filed April 3, 1952
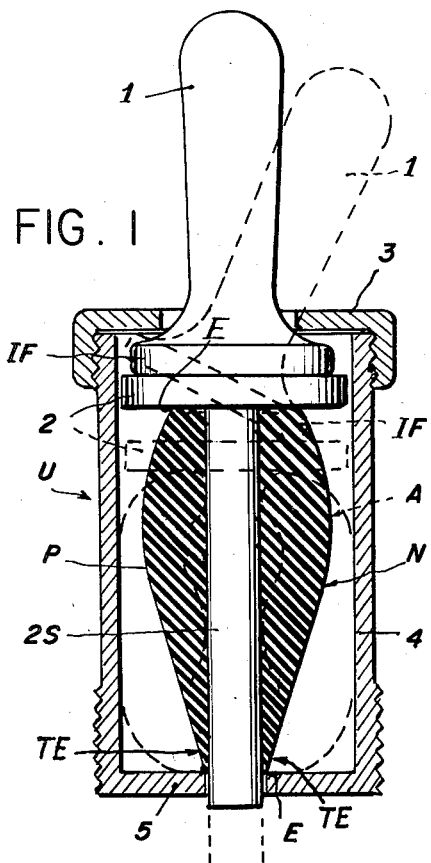
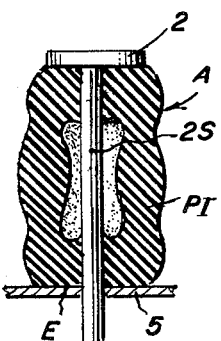
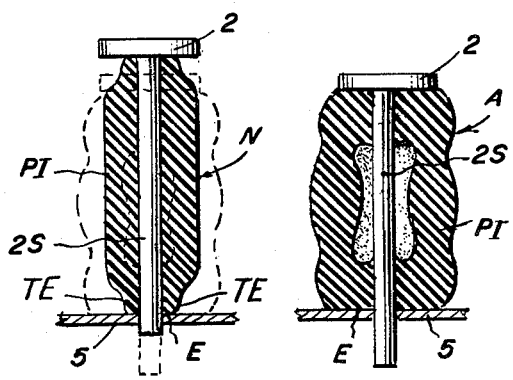
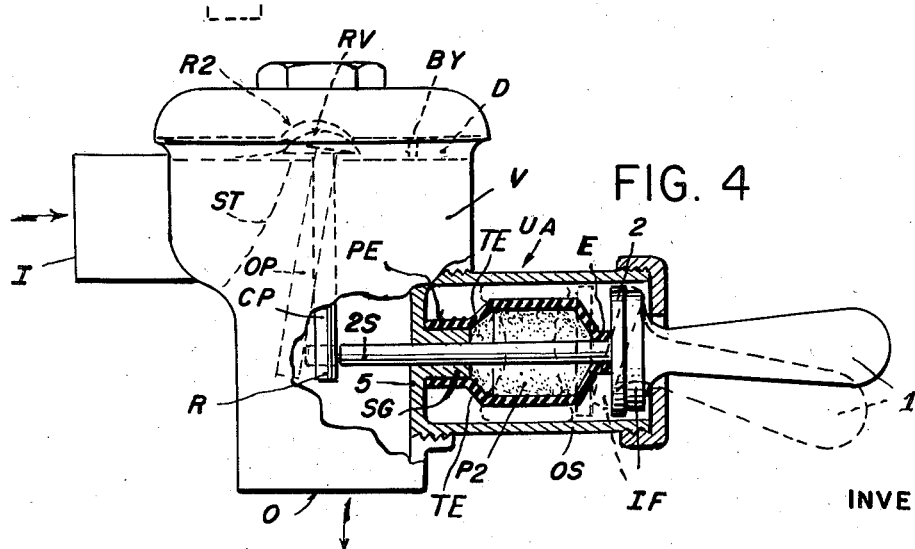
INVENTOR
J. D. Langdon

United States Patent Office 2,815,678
Patented Dec. 10, 1957

2,815,678

PLUNGER ACTUATOR-PACKER

Jesse D. Langdon, Long Beach, Calif.

Application April 3, 1952, Serial No. 280,437

7 Claims. (Cl. 74—503)

The present invention relates to plunger actuators and packings for combination with valves for controlling the flow of pressure fluid between source and destination and constitutes new and novel means of providing a combined plunger actuator and packing surrounding the stem of a plunger provided with a head at one end, the opposite end of the stem extended thru the wall of a passageway provided for pressure fluid flowing thru the valve.

The primary purpose of the invention is to provide a plunger actuator-packer member having a body made of resilient deformable material capable of being deformed and returning to original form, and being shaped to surround a stem projecting from a head provided for the plunger, at least one portion of and forming a terminal edge for the member surrounding the stem being of substantially smaller diameter than the adjacent portion of said body; the smaller diameter terminating within not more than half the length of the resilient body and adapted for involute action at such times as the plunger actuator is compressed between the head of the plunger and an oppositely disposed wall thru which the end of the stem opposite said head is slidably inserted.

One object is to provide a plunger actuator-packer member made of rubber-like material having a shouldered body with at least one end tapered to a relatively small diameter forming a forwardly projecting narrow edge adapted to be urged and merged concentrically into said shouldered body, rolling a portion of the edge of the body inwardly, by involute action spreading said shoulder diametrically and spacing a portion of the inside of said body away from a stem inserted and extended thru said body, the involute action being set up by compressing the two ends of said body between a head provided for said stem and an oppositely disposed partition thru which said stem is slidably inserted.

A further object is to provide a plunger actuator-packer in combination with a valve handle and actuator assembly contained in a shell and capable of being manufactured as a separate unit, or partly integral with a pressure operated valve unit, eliminating the usual springs, packing glands and adjusting nuts.

The figures and designating characters of the drawing used for purpose of description only as set forth by the specification are:

Figure 1 represents one adaptation of the invention contained in a complete assembly unit.

Figure 2 shows the normal position of the plunger and packer member at rest.

Figure 3 shows the packer in distorted position when compressed by the plunger.

Figure 4 shows a variation of the packer unit in assembled position with a valve.

Fig. 1 representing one adaptation of the invention contained in a complete assembly unit U, including handle 1 having a flange 1F normally impinging a proximate flanged end of a plunger 2 having a flanged head with stem 2S extended thru one form of plunger actuator-packer P, normal position N shown by solid outline, abnormal position A shown in broken lines. Positions of handle 1 and plunger 2 are likewise shown corresponding to normal position N and abnormal position A of plunger P; all held in assembled relationship by cap 3 screw threaded over the open end of a tubular shell 4 having a closed end forming a partition 5 with stem 2S extended therethru. The actuator-packer extends and impinges between the head of plunger 2 and partition 5.

When handle 1 is tipped to the broken line position, flange 1F urges the flanged head of plunger 2 toward and compresses actuator-packer P against partition 5 causing at least one of the opposite end portions of actuator-packer P to merge into and be at least partially enveloped by an enlarged portion of packer P due to involute action resulting, due to structural characteristics embodied in the shape of actuator-packer P constructed with at least one of its ends presenting substantially narrow annular edge rolled inwardly of a relatively large body portion of packer P when under compression thus resulting in an involute end when stress is applied thereagainst.

It is obvious that when the actuator-packer is compressed between plunger head 2 and partition 5, the stem slides thru the portion of actuator-packer member P resting against partition 5, at least part of tapered end TE between edge E and larger diameter of member P is compressed by pressure of handle flange 1F against the outer side of head of plunger 2 causing the material of the enlarged portion N of member P to envelop tapered end TE, rolling the material immediately above edge E and inside the passageway for the stem 2S thus by involute action wedging apart and spreading a portion of member P, P1 or P2 immediately adjacent and above the involute end, away from stem 2S, at the same time the opposite end edges E are urged convergently inwardly by involute action, tightly hugging stem 2S or stem guide boss forming stem guide SG of Fig. 2 as the case may be.

Fig. 2 shows normal position of plunger 2 and member P1 in normal position of rest, the broken lines showing abnormal positions of same, illustrated by Fig. 3, showing approximately how member P1 is abnormally distorted when the opposite narrow annular edged ends E are impinged and member P1 is compressed between flange 2 and partition 5; the narrow annular edged ends bing merged concentrically within the enveloping enlarged or shouldered portions N of member P1 by involute action.

Fig. 4 shows a portion of pressure operated valve V cut away above outlet end O, with a packer-actuator unit alternative form UA, showing in section, an outer shell OS threadedly secured to valve V and encasing flange 1F of handle 1 resting against the flange of plunger 2 as in Fig. 1. The alternate form of actuator-packer member P2 is formed with a hollow body having a relatively thin wall with projecting end PE having narrow annular edges E surrounding stem guide SG and stem 2S and projecting toward the head of plunger 2 and resting against partition 5. When handle 1 is moved to the position shown by broken lines, the two ends of member P2 being impinged by and compressed between the head of plunger 2 and partition 5, involute action rolls the material of the two opposite annular edges of the ends of member P2 to merge within the shouldered or enlarged portion of member P2. The valve V represents a convetnional flush valve. The cutaway portion exposes the lower end of relief valve R which is actuated by the end of stem 2S thru the lateral movement of handle 1. The top or head of relief valve R rests on the upper side of a diaphragm made of flexible material which is provided with a bypass BY and normally intervenes between seat ST and inlet 1. A pressure chamber is formed above diaphragm D. When liquid under pressure is flowing thru inlet 1, bypass BY permits same to enter a pressure chamber formed above diaphragm D seating same against seat ST when relief valve R is in closed position RV.

When relief valve R is tipped in position R2, liquid is passing thru outlet O of valve V, the actuator-packer P, P1 or P2 serves not only to prevent leakage thru handle unit U or UA, but also as an actuator to reutrn related moving parts of unit U or UA to normal position of rest after handle 1 has been used to open the valve.

Having described the invention and the operation thereof, the following claims are made.

I claim:

1. A plunger actuator-packer assembly, including, a tubular housing having a plunger provided with a head and having a stem reciprocally mounted within and between the two ends of the housing, said stem journaled thru a closed end provided for said housing, said head disposed at the opposite end of said housing and exposed to manual actuation, being combined with: an actuator-packer member made of resilient rubber-like material surrounding said stem and held between the plunger head and said closed end, at least one end of said actuator-packer member being relatively smaller than a swelled portion of the packer juxtaposition immediately concomitant the small end, same being small enough to recede into said swelled portion by involute action at such times as said plunger is actuated, thereby tending to urge the swelled portion away from said stem between the ends of said stem, pressure against the head of said plunger urging the relatively small area of said small end firmly around said stem adjacent the journaled portion of said stem, packing the proximate end of the journal against leakage of pressure fluid around said stem, the resilient qualities of said member causing same to resume normal shape after being distorted.

2. In combination, a laterally extended shell adapted to be attached to the outlet end of a valve body and forming a housing containing the flanged end of a handle projecting thru and held in operative position by the outer end of said shell, a plunger having a head resting and held against the flange of said handle and having a stem surrounded by a sleeve member forming an actuator-packer made of distortable resilient material, said stem slidably inserted thru a partition formed by an inner end of said shell, opposite ends of the resilient member normally impinged between supporting surfaces provided by said inner end and the plunger head, the outer end of said shell providing a fulcrum for the periphery of said flange of said handle; said actuator-packer member formed with at least one end substantially smaller in diameter than an enlarged adjacent body portion constituting a relatively large substantially obtuse shoulder projecting radially beyond the smaller portion same being free to telescope within the enlarged portion, whereby at such times as the sleeve is compressed endwise, the small end resting against an adjacent surface is compressed and urged into the enlarged portion in an involute fashion.

3. A plunger actuator-packer adapted to be encased by a tubular housing having one end provided with an opening surrounded by an inturned flange, the opposite end of the housing formed with a partition being closed with an axial opening therethru forming a journal for the stem of a plunger extended thru said journal and provided with a head at least indirectly supported by the inside of said inturned flange, a sleeve-like member made of rubber-like material surrounding said stem between said partition and said head and supporting said plunger in normal position of rest, the head of said stem exposed for manual actuation, wherein: the sleeve is formed with an enlarged body portion surrounding said stem and having at least one end portion of relatively small diameter, the external contour of said sleeve including a body portion sharply bulged immediately above the small end portion, the bulged portion being large enough to permit said small portion to recede into the larger portion, the smaller portion providing a support for only that portion of the bulged portion lying next to and surrounding said stem, said smaller end being adapted for free involution into the larger portion and providing the sole supporting medium for said bulged portion until such time as said smaller portion is involved within the larger portion of said sleeve.

4. A plunger actuator-packer comprising a tubular housing provided with a closed inner end and an inturned outer end retaining a plunger having a head forming an annular shoulder surrounding a stem extended and journaled thru said closed inner end, a resilient member made of deformable material capable of resuming shape surrounding said stem between said annular shoulder and the journaled end of said housing and forming a packing closing a clearance space provided between the journal and stem, the resilient member formed with a relatively small end portion resting against that portion of said closed inner end surrounding the journal and being substantially smaller in diameter than an immediately enlarged proximate portion of said resilient member and small enough in converse relationship with the proximate portion of said resilient member to provide a bulge projecting beyond and overhanging the outer bounds of the smaller portion, both larger and smaller portions being free of surrounding extraneous support, the small portion subject to being convolved with the larger portion when the head of said plunger is urged toward the journaled end, the larger portion of said resilient member capable of expanding to permit involution of the smaller into the larger portion of said resilient member, an inwardly extended flange provided for that end of said housing that embraces the plunger head and bordering an opening exposing said head to manual manipulation.

5. A device as defined by claim 2; wherein the laterally extended shell forms a self contained unit provided with coupling means for attachment to a valve casing, the shell forming a tubular housing having a closed end, encompassing a journal for the plunger stem, a relatively small end portion of the deformable member presenting a substantially narrow annular edge registering against a clearance space provided between the stem and the outer confines of the journal opening surrounding said stem.

6. An actuator-packer member as defined by claim 2; wherein both ends are smaller than a bulged portion formed by a thicker wall section of resilient material provided between the two ends, whereby the bulge and smaller ends are subject to convolution when the opposite ends of the resilient member are compressed toward one another.

7. A deformable actuator-packer member as defined by claim 4; wherein the resilient member is formed with the bulged portion consisting of a relatively thin wall of resilient material surrounding an annular hollow normally surrounding a plunger stem, a smaller end of the resilient member encompassing an extension forming a supporting wall for the journal provided for said stem.

References Cited in the file of this patent

UNITED STATES PATENTS

| | | |
|---|---|---|
| 269,531 | McGinley | Dec. 26, 1882 |
| 630,940 | Sieben | Aug. 15, 1899 |
| 787,591 | Sonnefeld | Apr. 18, 1905 |
| 957,347 | Kennedy | May 10, 1910 |
| 1,305,868 | Baun | June 3, 1919 |
| 1,860,974 | Zinkil | May 31, 1932 |
| 2,255,322 | Langdon | Sept. 9, 1941 |
| 2,506,140 | Delany | May 2, 1950 |